United States Patent [19]

Sato

[11] 4,445,634
[45] May 1, 1984

[54] BLANK SHEET OF PACKAGING CASE FOR VIDEO TAPE CASSETTE

[75] Inventor: Yoshihiro Sato, Tokyo, Japan

[73] Assignees: Dai Nippon Insatsu K.K., Tokyo; Victor Company of Japan, Ltd., Kanagawa, both of Japan

[21] Appl. No.: 420,239

[22] PCT Filed: Feb. 12, 1982

[86] PCT No.: PCT/JP82/00040
§ 371 Date: Sep. 17, 1982
§ 102(e) Date: Sep. 17, 1982

[87] PCT Pub. No.: WO82/02791
PCT Pub. Date: Aug. 19, 1982

[30] Foreign Application Priority Data

Feb. 13, 1981 [JP] Japan ............................ 56-18177[U]

[51] Int. Cl.³ ...................... B65D 5/02; B65D 85/672
[52] U.S. Cl. ....................................... 229/40; 206/387
[58] Field of Search ................... 229/40, 31 FS, 34 R; 206/387

[56] References Cited

U.S. PATENT DOCUMENTS 1,433,801 10/1922 Conley .................................. 229/40
1,877,601 9/1932 Shapiro ............................ 229/31 FS
2,331,188 10/1943 Head ..................................... 229/40
3,160,344 12/1964 Bagren ................................. 229/40

FOREIGN PATENT DOCUMENTS 2156630 9/1972 Fed. Rep. of Germany ... 229/31 FS

Primary Examiner—Herbert F. Ross
Attorney, Agent, or Firm—Koda and Androlia

[57] ABSTRACT

In a blank sheet of a case for packaging a video tape cassette having main panels 1, 2, a black panel 3, and side panels 4, 5, 14, 15, side flaps 11, 12 are projectingly provided from the end edges of the side panels 4, 5 belonging to one main panel 1 toward the side panels 14, 15 belonging to the other main panel 2, and when, at the time of case forming, these side flaps 11, 12 are placed into the inner side of the back panel 3, and hot air is supplied into wedge-shaped spaces W between the opposed side flaps, 4, 14 and 5, 15 thereby to fusion bond the opposed side flaps, the hot air is prevented from reaching the cassette inserted beforehand into the case.

2 Claims, 7 Drawing Figures

BLANK SHEET OF PACKAGING CASE FOR VIDEO TAPE CASSETTE

TECHNICAL FIELD

This invention relates to a blank sheet of a case used for packaging a video tape cassette.

BACKGROUND ART

Video tape cassettes for recording television pictures are accommodated and packaged in cases for purposes such as protection, labeling particulars, and decoration. Such a case for packaging a cassette is ordinarily made into a product by blanking or cutting out into a prescribed shape a relatively thick sheet material such as cardboard, boxboard, or plastic sheet as folding-in crease lines are formed therein thereby to form a blank sheet, folding this blank sheet in the shape of a case, and bonding together with an adhesive the overlapping portions of the side panels. A cassette is then inserted into this case and packaged to be distributed and used.

By a process of packaging into a case as described above, the formed case assumes a large volume in comparison with the state of the blank sheet, and it not only is disadvantageous in storing and transporting but also requires a work process wherein the cassette is inserted into and accommodated within the case and is accompanied by problems such as the requirement of an unexpected work time occasionally in instances wherein a case does not fit the cassette.

Ordinarily, when a case is formed by using a material such as a sheet of thermoplastic material such as polypropylene, polyethylene, or polystyrene or a laminated material including a paper or some other core sheet having on the surfaces thereof layers of these plastics, the overlapping parts of the side panels of the case are being bonded together by the measure of pressing them together under heating or of imparting ultrasonic or supersonic waves or high-frequency waves to them under pressure, but in this procedure it is necessary to insert a backup plate into the case, and forming of the case in a state wherein a cassette is accommodated therein cannot be carried out. Consequently, the forming productivity of the case forming process is of low efficiency of the order of 30 cases/minute, at the most, attendant upon the operation of inserting and extracting the backup plate.

Accordingly, in order to carry out with high efficiency the forming of the case in a state wherein a cassette is accommodated therein, there has been proposed means for injecting hot air between the opposed surfaces of the side panels to be overlapped thereby to instantaneously heat only the surface layers of the opposed surfaces of the side panels and to cause them to be fusion bondable or weldable, and immediately contact bonding the same, but with a conventional case, because of its construction described in detail hereinafter, this hot air infiltrates into the case interior and gives rise to problems such as heat deformation and deterioration of the accommodated cassette, and for this reason, this proposal has been one which was impossible to realize in practice.

DISCLOSURE OF THE INVENTION

Accordingly, it is an object of this invention to provide a blank sheet of a packaging case for a video tape cassette, having a shape such that, even when heating of the side panel opposed surfaces is carried out by injection of hot air, the injected hot air does not infiltrate into the case interior in the packaging process.

According to this invention, the above stated object is achieved by a blank sheet of a case for packaging a video tape cassette, comprising a back panel of elongated shape, a first main panel connected to one end edge of the back panel by way of a folding crease line, a second main panel connected to the other end edge of the back panel by way of a folding crease line, a pair of first side panels connected to both side edges of the first main panel in directions perpendicular to the lengthwise direction of the back panel by way of folding crease lines, a pair of second side panels connected to both side edges of the second main panel in directions perpendicular to the lengthwise direction of the back panel by way of folding crease lines, and a pair of side flaps connected respectively to edge parts of the first side panels on the side of the back panel by way of folding crease lines, surfaces to be opposed to each other of the first and second side panels being formed as heat bondable surfaces.

BEST MODE FOR PRACTICING THE INVENTION

Figure 1:
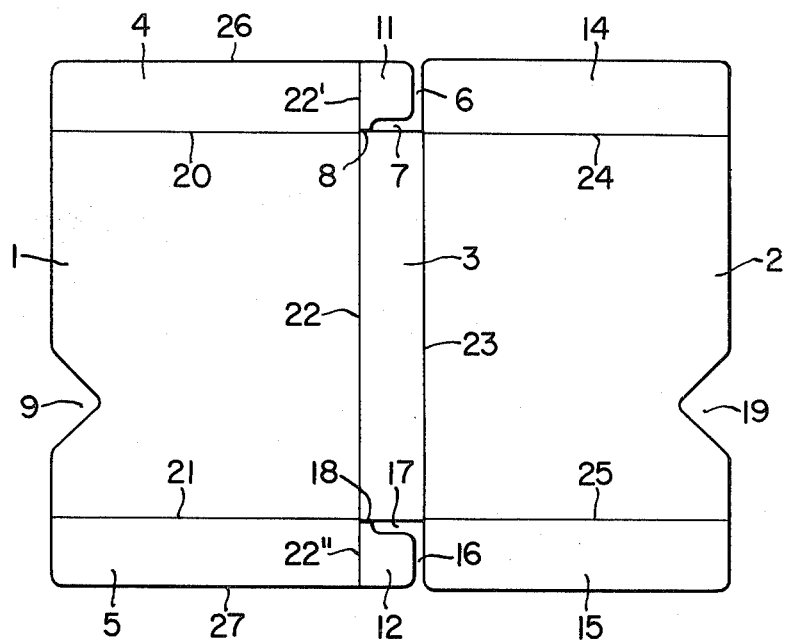
FIG. 1 is a developmental view of a blank sheet for a packaging case of this invention.

FIG. 1 shows one example of the blank sheet for a video tape cassette packaging case of this invention, and this blank sheet has been formed by die-cutting or die-punching a sheet of a thickness of 0.5 to 1 mm. of a foamed polypropylene compressed sheet material. In the same figure, reference numeral 1 designates a first main panel of dimensions conforming to the shape of the largest surface of the video tape cassette to be accommodated, and, to one side of this main panel 1 is connected a second main panel 2 by way of a back panel 3 of a width conforming to the thickness of the cassette. The second main panel 2 is of substantially the same size as the first main panel 1, but its dimension in its long-side direction is made greater than the first main panel 1 by the sum of the thicknesses of two sheets. To the short sides of the first main panel 1, respectively, are connected first side panels 4 and 5. The widths of these side panels are of a dimension conforming to the thickness of the cassette case. On the edges of the side panels 4 and 5 on the second main panel 2 side, side flaps 11 and 12, respectively, are contiguously provided. On the one hand, on the short sides of the second main panel 2, also, there are continuously provided second side panels 14 and 15, respectively, similar to the first side panels 4 and 5. However, the widths of the second side panels 14 and 15 are each greater than the first side panels 4 and 5 by the value of the thickness of the sheet.

The side flaps 11 and 12 have respectively between them and their confronting second side panels 14 and 15 and the end edges of the back panel 3 cut-out gaps 6, 7 and 16, 17 of slightly wide widths, by which the folding in of the side flaps is facilitated. Furthermore, at the proximal parts of the side flaps 11 and 12, projections 8 and 18 are provided.

At the boundaries between these first main panel 1, back panel 3, and second main panel 2, crease lines 22 and 23 for folding in; between the first main panel 1 and the first side panels 4 and 5, crease lines 20 and 21 for folding in; also between the second main panel 2 and the second side panels 14 and 15, similar crease lines 24 and 25 for folding in; and further between the first side panels 4 and 5 and the side flaps 11 and 12, crease lines 22' and 22'' for folding in are respectively provided.

Reference numerals 9 and 19 designate cutouts provided at the outer side edges of the main panels 1 and 2 for facilitating the taking out of the cassette accommodated within the case.

The blank sheet of the above described constitution is used for packaging a video tape cassette by an automatic folding-in process such as the following, for example.

Figure 2:
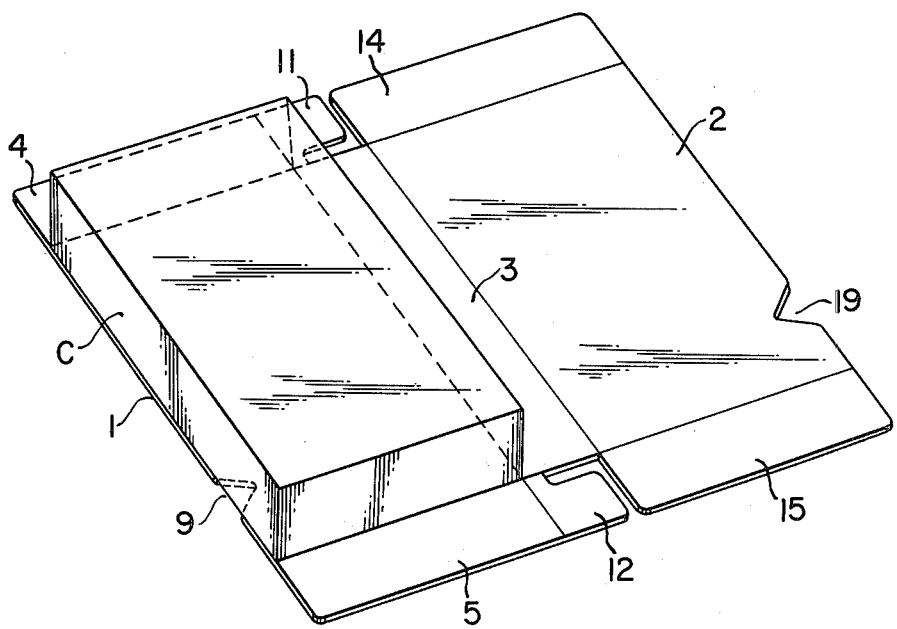
FIG. 2 is a perspective view showing the state in an initial stage of packaging in which a cassette has been placed on the blank sheet.
Figure 3:
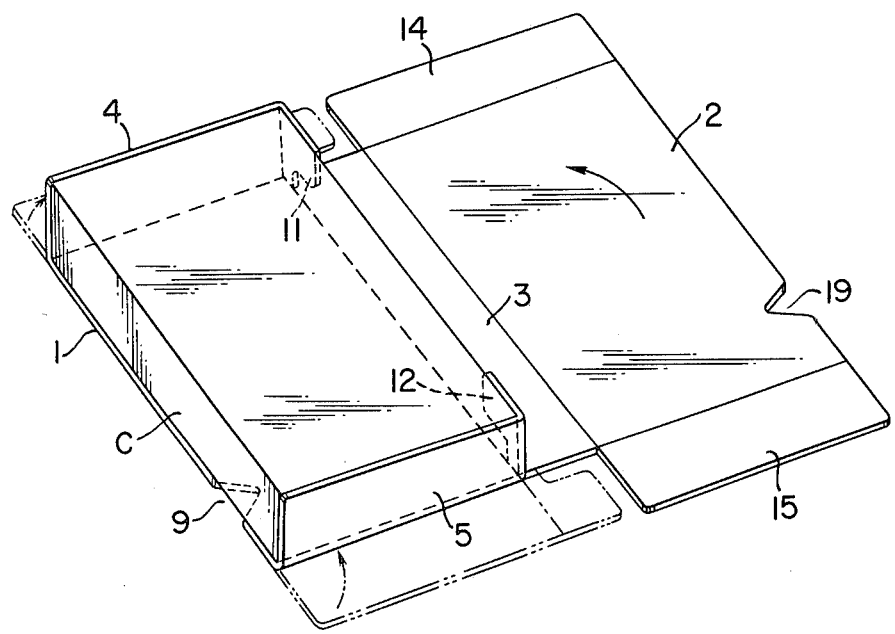
FIG. 3 is a perspective view showing the state in the succeeding packaging stage in which side panels and flaps of the blank sheet have been folded in toward the cassette.
Figure 4:
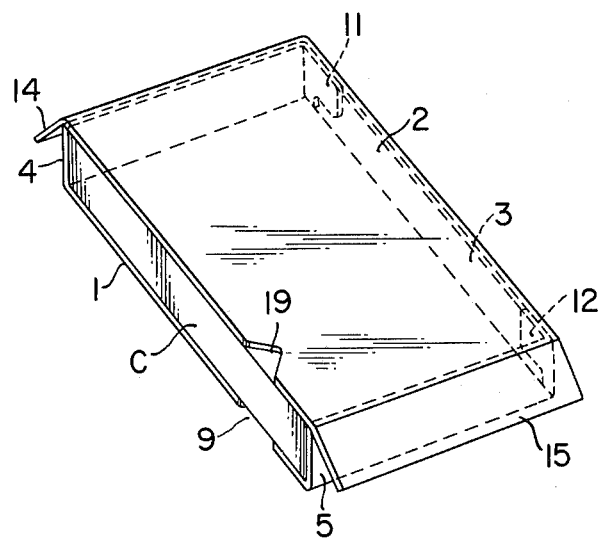
FIG. 4 is a perspective view showing the state in a further advanced packaging stage.
Figure 5:
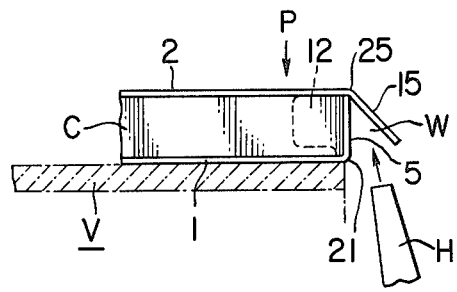
FIG. 5 is a front view showing the state at the time of hot air injection.

First, after a cassette C has been placed on the first main panel 1 as shown in FIG. 2, the first side panels 4 and 5 are caused to stand upright and, further, the side flaps 11 and 12 are press folded by a pressing plate in directions perpendicular thereto as indicated in FIG. 3. Then the back panel 3 is caused to stand upright, and, further, the second main panel 2 which has become upright together with this is folded in perpendicularly thereby to cover the upper surface of the cassette C as shown in FIG. 4, the side panels 14 and 15 of the second main panel 2 being pressed and bent at the same time into a sloped state, whereupon the state shown in FIG. 4 is attained. At this time instant, the end edges 26 and 27 (FIG. 1) of the side panels 4 and 5 associated with the first main panel 1 adhere closely to the inner sides of the crease lines 24 and 25 of the second main panel 2, and, at the same time, the side flaps 11 and 12 cover corner parts of the cassette C to assume the state of FIG. 5 wherein they are in intimate contact with the inner surface of the back panel 3.

The process described above is carried out in entirety on a traveling conveyor belt V. Then, in the state of FIG. 5, the case in which the cassette C is accommodated on the conveyor belt V is pressed from its upper surface in the direction of the arrow P by a suitable member, and, at this time: hot air at approximately 300° C. is injected for approximately 0.5 seconds from flat nozzles H positioned on both sides of the conveyor belt V over the entire lengths of wedge-shaped spaces W formed between the side panels 5 and 15 and the other side panels 4 and 14 of the two main panels; the opposed surfaces of both side panels 5, 15 and 4, 14 are heated; the surface layers thereof are rendered into molten state; and immediately the side panels 14 and 15 in sloped state of the second main panel 2 are pressed into adhesion by suitable pressing members against the surfaces of respectively opposed side panels 4 and 5 thereby to carry out fusion bonding, whereupon the packaging of the cassette into the case is completed.

At the time of the aforementioned hot air injection, since the end edges 26 and 27 of the side panels 4 and 5 of the first main panel 1 and the surfaces of the side flaps 11 and 12 are completely in intimate contact respectively with the second main panel 2 and the back panel 3, there is no infiltration of the hot air to the surface of the cassette accommodated within the case, and since the temperature rise of the panel sheet due to the hot air injection is confined to only the surface layer thereof, damage to the cassette due to the hot air is completely prevented.

In the above described instance, the temperature, injection pressure, and injection quantity of the hot air are, of course, suitably varied depending on the kind, shape, etc., of the blank sheet material, and, by this measure, automatic packaging of 100 cassette/minute or more into cases can be carried out.

Figure 6:
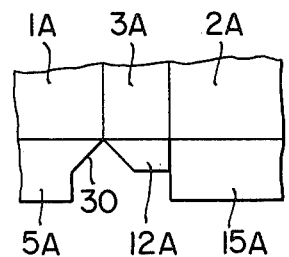
FIG. 6 is a partial plan view of a known blank sheet used for a case for packaging of a video tape cassette.
Figure 7:
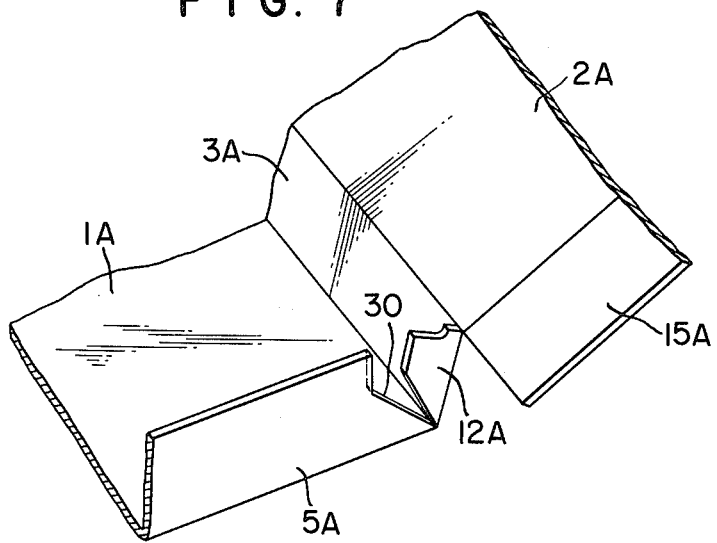
FIG. 7 is a perspective view of the same part.

FIGS. 6 and 7 show essential parts of a folding-in corner part of a blank sheet of a case which was in use hereinbefore for a video cassette. In this instance: a first main panel 1A, a back panel 3A, a second main panel 2A, and a side flap 12A of trapezoidal shape connected to the back panel 3A are provided; a side panel 5A of the first main panel 1A has a cutout 30 conforming to the trapezoidal shape of the side flap 12A, the cutout end edge of the side panel 5A and the end edge of the side flap 12A being caused to abut together at the time when the panels and flaps are folded into box shape, whereby the side panel 5A and the side flap 12A become coplanar; and in this state, the side panel 5A and the side flap 12A are bonded to the inner surface of a side panel 15A of the second main panel 2A.

In this connection, the remaining corner part is similarly constituted. In this instance, however, even if the forming of the case can be carried out, hot air reaches the interior of the case when the hot air is injected for forming the case in the state wherein it is accommodating a cassette and gives rise to heat damage of the cassette.

As described above, the blank sheets of this invention for forming a packaging case make possible safe and positive packaging of cassettes by the use of a hot air injection joining means, and its contribution toward elevation of packaging efficiency is great.

INDUSTRIAL APPLICABILITY

This invention is applicable to packaging cases of various rectangular articles which are subject to damage when heated.

I claim:

1. A blank sheet of a case for packaging a video tape cassette, comprising a back panel (3) of elongated rectangular shape having two long edges and two short edges, a first main panel (1) connected to one long edge of the back panel (3) by way of a folding crease line (22), a second main panel (2) connected to the other long edge of the back panel by way of a folding crease line (23), a pair of first side panels (4, 5) connected to both side edges of the first main panel (1) in directions perpendicular to the lengthwise direction of the back panel (3) by way of folding crease lines (20, 21), a pair of second side panels (14, 15) connected to both side edges of the second main panel (2) in directions perpendicular to the lengthwise direction of the back panel (3) by way of folding crease lines (24, 25), and a pair of side flaps (11, 12) connected respectively to edge parts of the first side panels (4, 5) on the side of the back panel (3) by way of folding crease lines (22', 22''), said side flaps (11, 12) having respectively recesses formed along said short edges of the back panel (3) so that gaps (7, 17) are respectively formed between the side flaps and the short edges of the back panel (3), said side flaps (11, 12) having integral projections (8, 18) disposed respectively at proximal parts thereof and protruding to reach respectively said short edges of the back panel (3) without being connected to the short edges thereby to cause said recesses to terminate short of the folding crease lines (22', 22") between the first side panels and the side flaps, surfaces to be opposed to each other of the first and second side panels being formed as heat bondable surfaces.

2. A blank sheet according to claim 1 in which gaps (6, 16) are respectively formed between the free end edges of the side flaps (11, 12) and the second side panels (14, 15).

* * * * *